US010063942B2

(12) United States Patent
Donaghey et al.

(10) Patent No.: US 10,063,942 B2
(45) Date of Patent: Aug. 28, 2018

(54) COMMUNICATIONS PROCESS, DEVICE AND SYSTEM

(75) Inventors: Andrew Paul Donaghey, Vermont South (AU); David Victor Octave Le Blanc, Ashburton (AU)

(73) Assignee: Freestyle Technology Pty Ltd, Victoria (AU)

( * ) Notice: Subject to any disclaimer, the term of this patent is extended or adjusted under 35 U.S.C. 154(b) by 0 days.

(21) Appl. No.: 13/260,834

(22) PCT Filed: Mar. 31, 2010

(86) PCT No.: PCT/AU2010/000367
§ 371 (c)(1),
(2), (4) Date: Nov. 16, 2011

(87) PCT Pub. No.: WO2010/111738
PCT Pub. Date: Oct. 7, 2010

(65) Prior Publication Data
US 2012/0054341 A1 Mar. 1, 2012

(30) Foreign Application Priority Data

Mar. 31, 2009 (AU) ................................ 2009901397

(51) Int. Cl.
*G06F 15/173* (2006.01)
*H04Q 9/00* (2006.01)
(Continued)

(52) U.S. Cl.
CPC ............... *H04Q 9/00* (2013.01); *H04W 4/20* (2013.01); *H04W 4/70* (2018.02);
(Continued)

(58) Field of Classification Search
USPC ................ 709/201, 202, 203, 204, 205, 206
See application file for complete search history.

(56) References Cited

U.S. PATENT DOCUMENTS 4,833,618 A 5/1989 Verma et al.
6,493,751 B1 * 12/2002 Tate .................... H04L 41/0843
370/254

(Continued)

FOREIGN PATENT DOCUMENTS

JP H05-048752 A 2/1993
JP 2002-232930 A 8/2002
(Continued)

OTHER PUBLICATIONS

International Search Report and Written Opinion; PCT/AU2010/000367.; J. Reisner; dated May 4, 2010.
(Continued)

*Primary Examiner* — Dhairya A Patel
(74) *Attorney, Agent, or Firm* — Fish & Richardson P.C.

(57) ABSTRACT

A method executed by a concentrator connected between a plurality of remote units and a management server, the method including:
(i) receiving and storing properties data associated with a remote unit including a microengine and a meter for measuring usage of a resource at a customer's premises, the properties data representing a profile of the remote unit;
(ii) receiving message data representing a request associated with the remote unit from the management server;
(iii) generating response data representing a response to the request based on the message data and the stored properties data; and
(iv) sending the response data to one of the remote unit and the management server, as determined by the request based on the message data.

19 Claims, 10 Drawing Sheets

(51) Int. Cl.
*H04W 4/20* (2018.01)
*H04W 4/70* (2018.01)

(52) U.S. Cl.
CPC ..... *H04Q 2209/30* (2013.01); *H04Q 2209/43* (2013.01); *H04Q 2209/60* (2013.01)

(56) References Cited

U.S. PATENT DOCUMENTS

| | | | | |
|---|---|---|---|---|
| 6,512,463 | B1* | 1/2003 | Campbell | H04Q 9/04 340/870.02 |
| 7,142,874 | B1* | 11/2006 | Oleniczak | H04B 17/309 455/456.3 |
| 2002/0071404 | A1 | 6/2002 | Park et al. | |
| 2003/0009301 | A1 | 1/2003 | Anand et al. | |
| 2003/0156041 | A1* | 8/2003 | Taisto | H04Q 9/00 340/870.02 |
| 2003/0156584 | A1 | 8/2003 | Bergenlid et al. | |
| 2003/0204756 | A1* | 10/2003 | Ransom | G01D 4/004 713/300 |
| 2005/0065742 | A1* | 3/2005 | Rodgers | G01D 4/004 702/62 |
| 2005/0131583 | A1* | 6/2005 | Ransom | H04L 63/08 700/295 |
| 2005/0270173 | A1 | 12/2005 | Boaz | |
| 2006/0071812 | A1* | 4/2006 | Mason, Jr. | G01D 4/004 340/870.02 |
| 2006/0095527 | A1* | 5/2006 | Malik | G06Q 10/107 709/206 |
| 2007/0197262 | A1* | 8/2007 | Smith | H04B 3/542 455/562.1 |
| 2007/0295803 | A1* | 12/2007 | Levine | G06Q 20/04 235/379 |
| 2008/0106426 | A1* | 5/2008 | Deaver | G01R 19/16547 340/657 |
| 2008/0192638 | A1* | 8/2008 | Massiera | H04W 36/30 370/237 |
| 2008/0259844 | A1 | 10/2008 | Richeson et al. | |
| 2010/0185338 | A1* | 7/2010 | Montgomery | H02J 3/14 700/292 |
| 2011/0035510 | A1* | 2/2011 | Alexander | G01D 4/002 709/246 |
| 2012/0266024 | A1* | 10/2012 | Jackson | G06F 21/577 714/35 |

FOREIGN PATENT DOCUMENTS

| | | |
|---|---|---|
| JP | 2003-348772 | 12/2003 |
| JP | 2005-513900 A | 5/2005 |
| KR | 10-2005-0092615 | 9/2005 |
| WO | 2001/015114 | 3/2001 |
| WO | 2002/030140 | 4/2002 |
| WO | WO 03-055031 A2 | 7/2003 |
| WO | WO 2003/055031 | 7/2003 |
| WO | WO 2005/059572 | 6/2005 |
| WO | 2008/005359 | 1/2008 |
| WO | WO 2009 000869 | 12/2008 |

OTHER PUBLICATIONS

JP Office Action w/ English Translation; JP 2012-502391; dated Feb. 18, 2014; 7 pp.
Supplemental European Search Report; EP 10757938.5; Ex. A. Sorrentino; dated Oct. 6, 2015; 6 pp.
Notice on the First Office Action; CN Appln. 201080019472.1; dated Nov. 5, 2013; English Translation; 19 pages.
Notice on the Sixth Office Action; CN Appln. 201080019472.1; dated Nov. 7, 2016; English Translation; 20 pages.
Notice of Final Rejection; KR Appln. No. 10-2011-7024513; dated Jan. 6, 2017; English Translation; 8 pages.
Japanese Office Action, with summary translation, for corresponding Appl No. 2015-126968, dated Jun. 21, 2017.
Japanese Decision of Refusal, with summary translation, for corresponding Appl No. 2015-126968, dated Jan. 10, 2017.

* cited by examiner

COMMUNICATIONS PROCESS, DEVICE AND SYSTEM

FIELD

The present invention relates to a communications process and system that may be used for monitoring and/or controlling consumption of a resource. In particular, the invention relates to a communications architecture for interrogating and controlling a network, or grid, of meter devices, and a concentrator of the communications architecture.

BACKGROUND

In communications systems for monitoring and controlling consumption of resources (such as water, electricity and natural gas), a meter may be configured to transmit meter data representing use of the resource to an associated management server. These systems have a number of limitations:
  (i) The meter data provided is typically very limited.
  (ii) Collecting required data from each meter for use in reporting to a National Electricity Market (NEM) is very slow and resource intensive.
  (iii) Each meter is typically limited to a particular communications protocol, and if a new communications system is installed, the legacy meters need to be replaced.
  (iv) The operation of the meter typically relates to the resource merely by measuring one or two quantities associated with the resource (e.g. electrical voltage and current, or water volume/rate), thereby limiting the information available to a system operator.
  (v) A meter is typically a pure measurement device, and any action in respect of the resource, such as shutting off a resource supply, must be done manually, e.g. by a service person visiting the meter.
  (vi) The degree of interaction available between a meter and a consumer at their premises is very limited.

It is desired to address or ameliorate the above, or to at least provide a useful alternative.

SUMMARY

In accordance with the present invention, there is provided a method executed by a concentrator connected between a plurality of remote units and a management server, the method including:
  (i) receiving and storing properties data associated with a remote unit including a microengine and a meter for measuring usage of a resource at a customer's premises, the properties data representing a profile of the remote unit;
  (ii) receiving message data representing a request associated with the remote unit from the management server;
  (iii) generating response data representing a response to the request based on the message data and the stored properties data; and
  (iv) sending the response data to one of the remote unit and the management server, as determined by the request based on the message data.

The concentrator may use the properties data to determine a link to use to send the response data to the remote unit. The concentrator may queue the response data in a data queue before sending.

The properties data may include at least one of:
  (i) measurement data representing a measurement of usage of the resource;
  (ii) configuration data representing a configuration of the remote unit, such as a meter device state or a measured usage value;
  (iii) data representing meter reading schedule;
  (iv) data representing demand side management profile information, such as a contract with a retailer;
  (v) data representing communications parameters;
  (vi) data representing configuration of meters and microengines with a communications connection to the remote unit;
  (vii) data representing carbon footprint information; and
  (viii) tariff data representing a tariff associated with usage of the resource.

The message data may include usage request data representing a request for measurement data representing a measurement of usage of the resource, or for cost data representing a cost of the usage based on the measurement and the tariff. The cost data represents the cost in accordance with a protocol selected by the operator associated with reporting requirements of an energy market. The protocol may be "NEM12" and the energy market may be the Australian National Electricity Market (NEM).

The message data may include control data representing a configuration change command to change a configuration of the remote unit.

The remote unit may receive second properties data for a second remote unit representing a second profile and send the properties data to the second unit. The remote unit may receive message data representing a request for a second unit from the concentrator and send the message data to the second unit.

The remote unit may send message data to an in-home display (IHD) for displaying of the data to a user. The properties data may include metered consumption details (bill) data representing a bill to be paid by the user for the usage of the resource.

The remote unit may send profile data to an in-home display (IHD) including at least one of:
  (i) configuration data provided by a regulator;
  (ii) usage history data representing periodic (e.g. daily/weekly/monthly) usage by a user; and
  (iii) alert data that may relate to a specific event.

The management server may generate report data for market participants in an energy market representing a report on the usage of the resource based on the properties data of the remote unit, in particular associated with the response data. The report data may represent a report on use of resources by a plurality of remote units.

The communications system may further include the remote unit in communication with the concentrator for delivering any queue data, including local properties data representing a local copy of the profile of the remote unit. The communications system may further include the management server in communication with the concentrator for generating and sending the message data based on the usage request being selected by an operator, or the configuration change command being selected by the operator. The configuration change command may include a tariff change for changing the tariff. The system may include the IHD in communication with the remote unit.

The present invention also provides a communications system for controlling and interrogating a network of distributed remote units including:

a network management server for requesting and serving data associated with the remote units;

concentrators for communicating with the network management server and communicating with respective remote units using respective communications protocols based on properties data maintained at the concentrators representing state and communications parameters associated with each remote unit; and remote units for serving properties data and message data to a concentrator and receiving data, including application files and service level data.

BRIEF DESCRIPTION OF THE DRAWINGS

Preferred embodiments of the present invention are hereinafter described, by way of example only, with reference to the accompanying drawings, in which.

DETAILED DESCRIPTION

Figure 1:
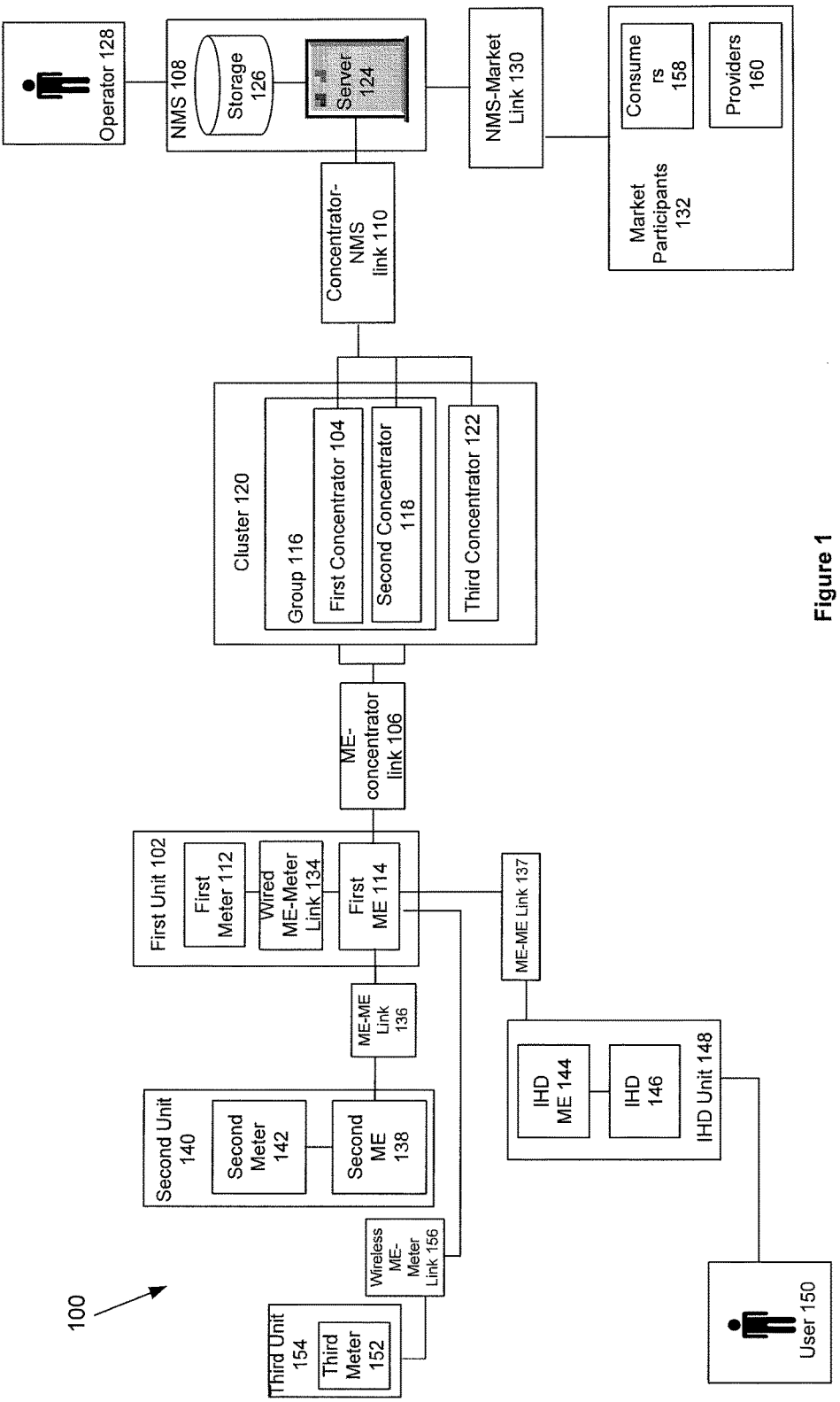
FIG. 1 is a schematic diagram of a preferred embodiment of a communications system.

A communications system 100, as shown in FIG. 1, includes a first meter unit 102 in communication with a first concentrator 104 using a concentrator link 106 which carries data between the first unit 102 and the first concentrator 104. The first concentrator 104 is in communication with a Network Management System (NMS) 108 using a concentrator-NMS link 110 which provides for data transmission between the first concentrator 104 and the NMS 108.

The first unit 102 includes a first meter 112 for monitoring/measuring and controlling usage of a resource, such as electrical power, water or gas, and the first meter 112 is in the form of an electricity meter, a water meter or a gas meter respectively.

The first unit 102 includes a first microengine (ME) 114 which is in communication with the first meter 112 and receives monitoring/measurement data from the first meter 112 and sends control data to the first meter 112. The first ME 114 sends data over the ME-concentrator link 106 to the first concentrator 104. The data sent by the first ME 114 to the first concentrator 104 includes:

(i) properties data representing a profile of the first unit 102 including a profile of the first meter 112 and/or the first ME 114 and profiles for any other devices associated with the first unit 102, such as a sensor or display unit;

(ii) response data to a management server 124, determined by an information request;

(iii) error or event details generated by the first unit 102; and (iv) user message data for the management server 124, generated through actions of user 150 in operation of an in-home display (IHD) unit 148

The properties data is stored in a properties file and includes a data record for the first unit 102 including values for communication parameters and for device parameters of the first unit 102, as shown in Table 1 and Table 2, respectively. The parameters include service level data based on a retailer agreement and associated with use of a resource monitored by a meter 112 associated with the ME 114. The properties data also includes (measurement) data representing measurement policies of usage of the resource monitored by the first meter 112, e.g. monitored periodically or on a real time basis.

TABLE 1

| Communication Parameters | Example Values |
| --- | --- |
| Communication method parameters | representing the protocol and equipment used for the ME-concentrator link 106, e.g., "GPRS" representing use of the general packet radio service protocol and equipment |
| Authentication parameters (login/password) | representing details required to authenticate for use of the ME-concentrator link e.g., "username" |
| routing parameters, including a speed parameter | representing values used for the ME-ME link or the ME-meter link: the speed may be for example 9600 baud |
| a supported protocols parameter | representing supported protocols that the ME can use for the ME-ME link or the ME-meter link, e.g., Serial, Coronis, Zigbee, or Ethernet |
| properties-per-protocol parameters | representing values that are required to provide the supported protocols. e.g., a network address, a Zigbee mesh ID, or security details for GPRS. |
| pass-through session parameters, including a time-out parameter and an escape-code parameter | representing values used in providing a pass-through session (described hereinafter), e.g., the time out may be 300 seconds and the escape code may be "*#*#" |

TABLE 2

| Device Parameters | Example Values |
| --- | --- |
| a firmware parameter | representing the level of firmware of the ME |
| application parameter, including a application version parameter | representing the version of each current application in the application module 212* |
| a supported meters parameter | representing which meters are supported by this ME |
| meter configuration parameters, including a meter address parameter and a meter password parameter | representing values used for provide the ME-meter link 134, 156, e.g., AMPY Passwords, Coronis Addresses, or WaveFlow Liters/Pulse |
| rates parameters, carbon footprint parameters and tariff parameters | representing billing values, such as price per unit of resource used (e.g., dollar per kilowatt-hour), and carbon footprint details (carbon multiplier) and graphing information. |
| a device state parameter | representing the state of the meter, e.g., typically "on", "off", or "flow limited" where only a limited amount of resource can be used |

The properties data also includes data representing the communications protocols and associated equipment that the remote unit 102, and in particular the ME 114, support:

(i) wireless data networking using "WiMax" or "WiFi" protocols and equipment;
(ii) mobile/cellular telephony data systems using third generation (3G) or fourth generation (4G) telecommunications protocols and equipment;
(iii) second generation mobile/cellular protocols and equipment providing the general packet radio service (GPRS);
(iv) Zigbee;
(v) Wireless Mesh;
(vi) CDMA; and
(vii) LTE.

The first concentrator 104 receives and transmits properties data to maintain a profile in the first concentrator 104 of the first unit 102 as summarised in the properties data. The first ME 114 and the first concentrator 104 communicate with each other to maintain generally matching copies of the profile of the first unit 102. Providing the profile of the first unit 102 in the first concentrator 104 allows the properties data of the first ME 114 to be more readily accessible to the NMS 108 because the concentrator-NMS link 110 has a better communications bandwidth than the ME-concentrator link 106, and the first concentrator 104 maintains copies of profiles of a plurality of meter devices, which are then accessible to the NMS 108 over the single concentrator-NMS link 110.

The first concentrator 104 is part of a concentrator group 116, as shown in FIG. 1, which includes the first concentrator 104 and a second concentrator 118. Both concentrators 104, 118 in the group 116 are in communication with the ME-concentrator link 106 and the concentrator-NMS link 110. The group 116 operates as a single unit when communicating with the first ME 114 and the first ME 114 does not distinguish between the concentrators in the group 116. The first 104 and second concentrators 118 each provide a primary link to a plurality of ME devices (including ME 114). In the event that first concentrator 104 is unavailable for communications, requests for an ME (e.g. ME 114) can be delivered by second concentrator 118. Concentrators form a group when all members in the group have the ability to be in communications with a shared pool of ME devices. The concentrators 104 and 118 in a group 116 provide redundancy within a group, and allow data queued for an ME to be managed such that the queue is spread across the group.

A concentrator cluster 120, as shown in FIG. 1, includes the first concentrator 104, the second concentrator 118 and a third concentrator 122 which are all in communication with each other, and represent a single concentrator with greater hardware redundancy and performance than a non-clustered concentrator. A cluster may include one or more groups of concentrators, and the concentrators in a cluster share the same communications protocol, i.e. WiMax, 3G, etc. The cluster 120 is a virtual implementation of a concentrator and appears to the NMS 108 as a single concentrator instance. The first 104 and second concentrators 118 act in unison to provide redundancy at the hardware level, and to balance the operating load across multiple concentrators.

The concentrator-NMS link 110 may operate using protocols and equipment associated with the public switched telephone network (PSTN) including a Digital Loop Carrier (DLC) for extending the reach of the PSTN and a MESH network, or Ethernet, Fibre, WiMax, 3G, LTE etc.

The NMS 108 includes a management server 124 in communication with the concentrator-NMS link 110 for exchanging message data between the NMS 108 and the first concentrator 104 (or the cluster 120). The server 124 sends message data including control data for changing the configuration of the first unit 102. The server 124 sends message data to request measurement data representing a measurement of resource usage from the first meter 112 via the first concentrator 104 (or the cluster 120). The NMS 108 includes storage 126 in the form of a group of databases including a Master Data Management (MDM) database provided by Oracle Corporation. The NMS 108 is operated by an operator 128 of the communications system 100, such as a smart grid management corporation.

The server 124 is in communication with an NMS-market link 130 which communicates with computers of market participants 132 who are entities who receive reporting data on the operation of a plurality of meter devices, including the first meter 112. The market participants 132 include consumers 158, providers 160, distributors, retailers, market administrators such as administrators of a National Electricity Market (NEM), e.g. NEMMCO, market data agents and market providers.

The ME's 114, 138 and 144 each include the meter device described in the International Patent Application No. PCT/AU2005/000917 and published as WO2006/000033, or the client processor device described in International Patent Application No. PCT/AU2005/000922 and published as WO 2006/000038 (both incorporated herein by reference). An ME can also comprise a virtual machine that runs by itself or with one or more other ME virtual machines on the one microcomputer. The ME can be downloaded to the remote unit 102, 140, 148 and updated and rolled back as required.

The first ME 114 communicates with the first meter 112 using a wired ME-meter link 134 which may be a software link where the hardware of the first ME 114 and the first meter 112 are integrated, or a wired link using a serial communications protocol between the first ME 114 and the first meter 112 in the first unit 102.

The first ME 114 is in communication with other MEs using machine-to-machine (M2M) interfaces including an ME-ME link 136 between the first ME 114 and a second ME 138 in a second unit 140 and in communication with a second meter 142, or an ME-ME link 137 for communication with a in-home device, IHD-ME 144 in communication with an IHD 146 in the IHD unit 148 of a home of a user 150 of the IHD 146. The ME-ME link 136, 137 may use one of the following protocols and associated equipment:
(i) the "Coronis" protocol from the Coronis Systems company;
(ii) the "ZigBee" protocol from the ZigBee Alliance, managed by Global Inventures Inc;
(iii) the "Bluetooth" protocol from Bluetooth SIG Inc.;
(iv) one of the "Wi-Fi" protocols under the IEEE 802.11 set of standards; and
(v) a "Home Area Network (HAN)" which may include Wired (over power lines), Ethernet or wireless networking;

The particular protocols used by the ME-ME link 136, 137 are associated with the values for the supported protocols parameter in the profiles of the communicating MEs.

The first ME 114 communicates with a third meter 152 of a third unit 154 using a wireless ME-meter link 156. The wireless ME-meter link 156 is equivalent in communication functionality to the ME-meter link 134 in terms of transmitting monitoring/measurement and control data; however the third meter 152 is a meter with more advanced measurement, control and communications capability than the first meter 112. For example, the third meter 152 may be an electronic "smart meter" from Landis+Gyr AG or an electronic "smart meter" from Itron Inc.

The ME links 136, 137, and 156 allow properties data, and firmware and application files, to be on forwarded from the MEs 114 and 138 to the units 140, 148 and 154, as described below.

In addition to meters and IHDs, an ME of the system can be associated with other measurement or controlled devices, such as a temperature sensor, a light, a strain gauge, a vibration sensor or a Demand Response Enabling Device (DRED) etc. For example, a remote unit may include a DRED to shut off an appliance, and the DRED may be controlled by a co-located ME or remote ME wirelessly.

Figure 2:
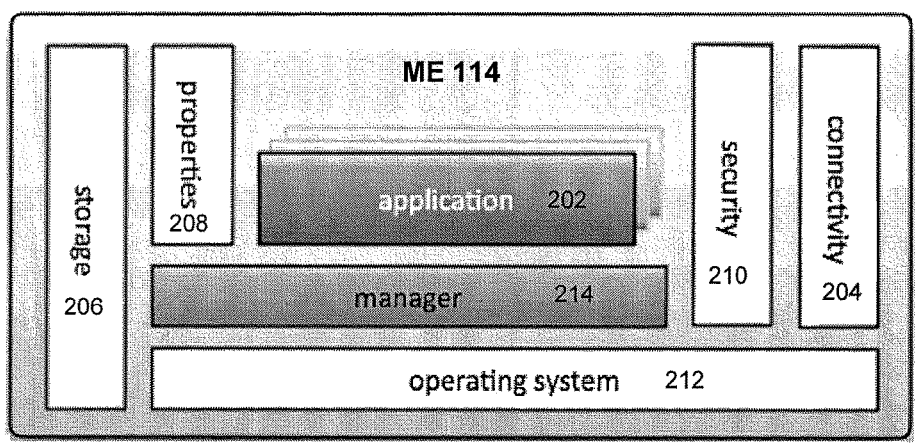
FIG. 2 is a block diagram of an architecture of a microengine (ME) of the communications system.

The ME 114 and other MEs in the system, including the second ME 138, include, as shown in FIG. 2:

(i) an application module 202 with script-style applications that provide functionality of the ME 114 including sending and receiving data using the ME-meter link 134, 156, sending and receiving data using the ME-concentrator link 106, validating measurement/monitoring data, updating the meter profile in the properties data, and enabling storage and retrieval of data;

(ii) a connectivity model 204 for providing the interfaces for the communications links 106, 134, 136, 137, 156 based on protocol and interface parameters in the profile of the ME 114; the connectivity module 204 establishes communications for outgoing connectivity and loads any protocol and interface parameters from the properties file; the connectivity module 204 also provides for identification and security validation of devices communicating using the links 106, 134, 136, 137, 156;

(iii) a storage module 206 for storing data on the ME 114 including a flash storage memory module;

(iv) a properties module 208 for storing the properties file of the ME 114;

(v) a security module 210 for supporting secure encrypted communications by the ME 114;

(vi) an operating system module 212 for executing the applications in the application module 202, for moving data in and out of the storage provided by the storage module 206, and for providing communications drivers for the connectivity module 204 to control the communications hardware of the ME 114. The OS module 212 determines whether an application can be executed depending on the installed interfaces; and (vii) a manager module 214 for receiving and storing data relating to versions and updates of the applications in the application module 202.

The applications in the application module 202 of the ME 114 provide the following functions:

(i) executing instructions represented by received message data including accessing required information stored in the ME properties file (in the properties module 208);

(ii) formatting message data to be sent to the second ME 138, ME 144 or meter 152 or to the concentrator 104 based on an appropriate format for the link defined in either the communication method parameter or the supported protocol parameter of the profile of the ME; and (iii) establishing the pass-through session in which incoming and outgoing communication ports are simultaneously opened and data is passed interrupted from one port to the other, used for downloading of firmware updates to third party devices such as the second ME 138 or the third meter 152 connected beyond the ME 114.

The instructions executed by the MEs relate to a variety of applications associated with the controlled devices in a customer's premises or home. In addition to applications associated with resource consumption, an ME can execute an alert application for displaying data on a IHD associated with an event. For example, the ME can provide display data to an IHD based on GPS and wind speed data delivered to the ME from the NMS, to display information relating to an approaching fire front and the time it is estimated to arrive at the home.

Figure 3:
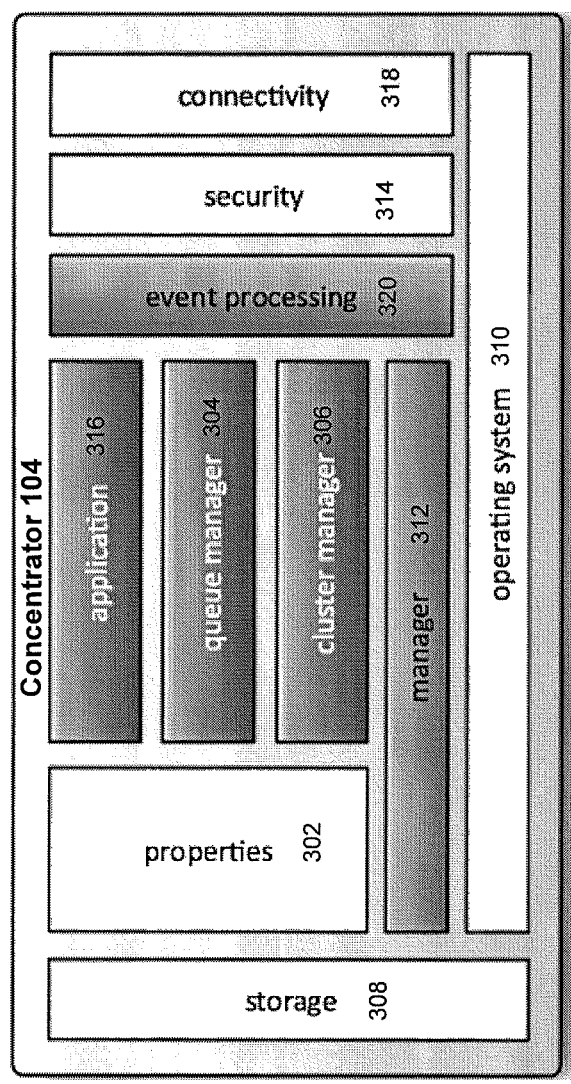
FIG. 3 is a block diagram of an architecture of a concentrator of the communications system.

The concentrators 104, 118, 122, as shown in FIG. 3, are implemented using a computer system, such as a hardware server produced by IBM Corporation or Sun Microsystems Inc., running an operating system 310 such as Linux. The concentrators 104, 118, 122 include a properties module 302 with properties data representing a profile for each ME in communication with the concentrator 104. The concentrator 104 includes a queue manager module 304 for managing a Job Queue for communicating with the MEs. The Job Queue allows for high bandwidth data from the concentrator-NMS link 110 to be converted to low bandwidth to be transmitted over the ME-concentrator link 106. The concentrator 104 includes a cluster manager module 306 for managing the cluster 120, a storage module 308, the operating system 310, a manager module 312 and a security module 314 that are generally equivalent to the corresponding modules in the ME 114. In the concentrator 104, the storage module 308 is used to store data gathered from MEs over the ME-concentrator link 106. The concentrator 104 includes an application module 316 with applications that start on the Job Queue, perform maintenance functions, and establish the pass-through session. The properties module 302 includes properties data relating to communications interface parameters for interfacing with different MEs over the ME-concentrator link 106; these communications interface parameters correspond to the communication method parameter of the ME profile in Table 1. The concentrator 104 includes a connectivity module 318 which provides a plurality of communications methods corresponding to the communication method parameters and the supported protocol parameters for communicating over the concentrator-NMS link 110 and the ME-concentrator link 106. The concentrator 104 includes an event processing module 320. The event processing module 320 supports the handling of asynchronous events delivered via the connectivity module 318 over the ME-concentrator link 106 (for example from ME 114).

Figure 4:
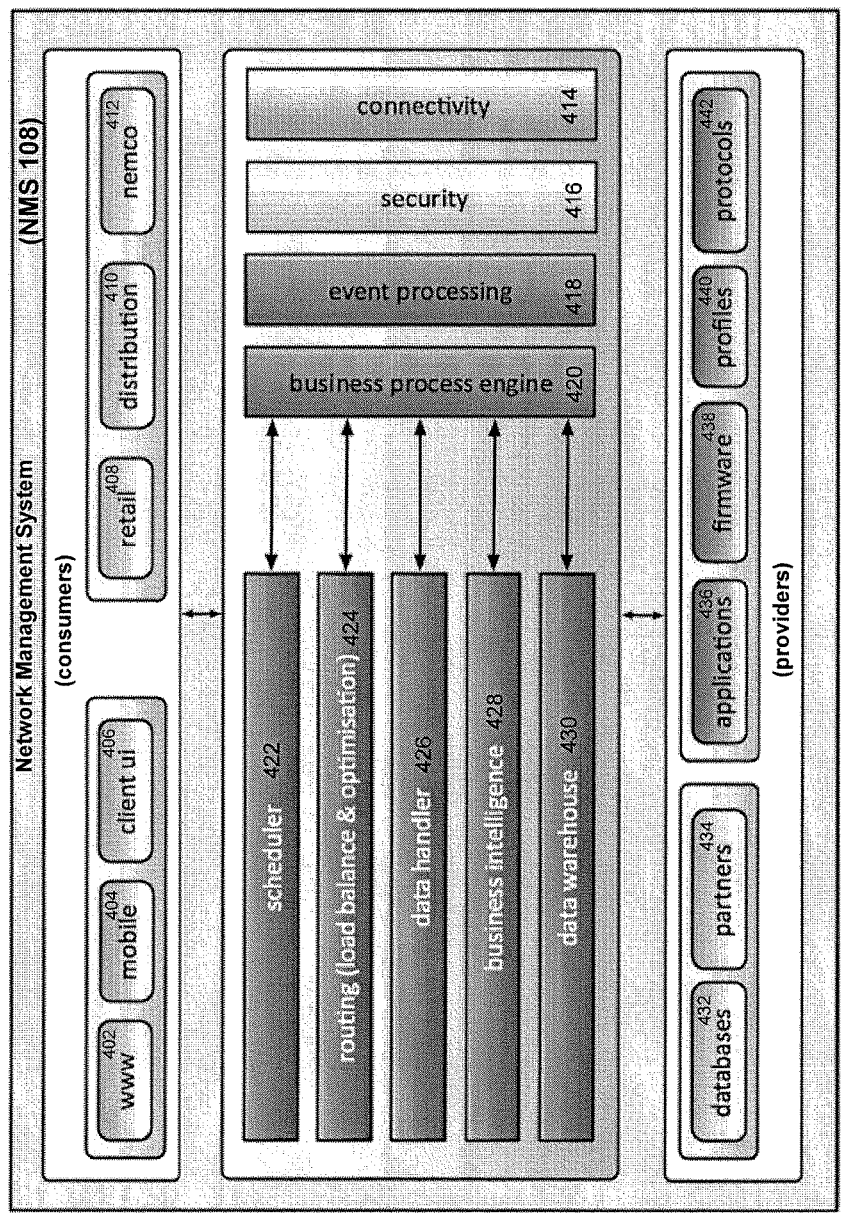
FIG. 4 is a block diagram of an architecture of a network management system of the communications system.

The NMS 108, as shown in FIG. 4, includes the following modules:

(i) a WWW module 402 for providing an Internet-based World Wide Web interface for communications between the NMS 108 and the consumers 158 over the NMS-market link 130. The module 402 may include a web server, such as Apache, and application server code, written in a language, such as Ruby or Perl;

(ii) a mobile module 404 for providing an interface for the consumers 158 using a mobile device such as a mobile telephone or a personal digital assistant (PDA);

(iii) a client user-interface (UI) module 406 for providing UI data to a client software program installed on a computer of the consumers 158;

(iv) a retail module 408 for providing retail data to Market participants 132 via the NMS-market link 130;

(v) a distribution module 410 for providing control of the all network functions 100 to the distributor.

(vi) an energy market operator (NEMMCO) module 412 for transmitting resource usage data to the market participants 132 and in particular the administrator of the market (e.g. the AEMO);

(vii) a connectivity module 414 for providing communications using the concentrator-NMS link 110 and the NMS-market link 130;

(viii) a security module 416 for providing secure communications with the concentrator 104 over the concentrator-NMS link 110 and with the market participants 132 over the NMS-market link 130;

(ix) an event processing module 418 used for handling and managing incoming and outgoing events from/to the concentrators and devices in the network.

(x) a business process engine 420 for coordinating and initiating the processes of the scheduler 422, routing (load balance & optimisation) 424, data handler 426, business intelligence 428 and data warehouse 430 components;

(xi) a scheduler module 422 for scheduling processes of the NMS 108;

(xii) a routing module 424 for balancing the network load of the NMS 108 and supporting redundancy within group 116;

(xiii) a data handler module 426 for receiving, transforming and sending data over the concentrator-NMS link 110 and the NMS-market link 130;

(xiv) a business intelligence module 428 including business rules describing the processes required for receiving, handing and processing incoming usage data, including transformation and event processing;

(xv) a data warehouse module 430 for storing and retrieving data in conjunction with the storage 126;

(xvi) a databases module 432 is used to store and manage data on storage 126;

(xvii) a partners module 434 supports integration of partner software platforms (e.g., Command Centre by Landis & Gyr) for control, reporting and transmission over network 100 for the control of devices network 100;

(xviii) an applications module 436 including the applications deployed to the First ME 114, Second ME 138 and IHD ME 144 for providing functionality specific to the role of the device in network 100;

(xix) a firmware module 438 for containing the firmware of the first ME 114, second ME 138 and IHD ME 144;

(xx) a profiles module 440 for building device specific profiles for first ME 114, second ME 138 and IHD ME 144 based on the policy associated with an ME; and (xxi) a protocols module 442 for accessing communications protocols for the connectivity module 414 from the data warehouse module 430. This allows devices such as the first ME 114, second ME 138 and IHD ME 144 to support different communication technologies including differences in associated protocol and data formats.

Figure 5:
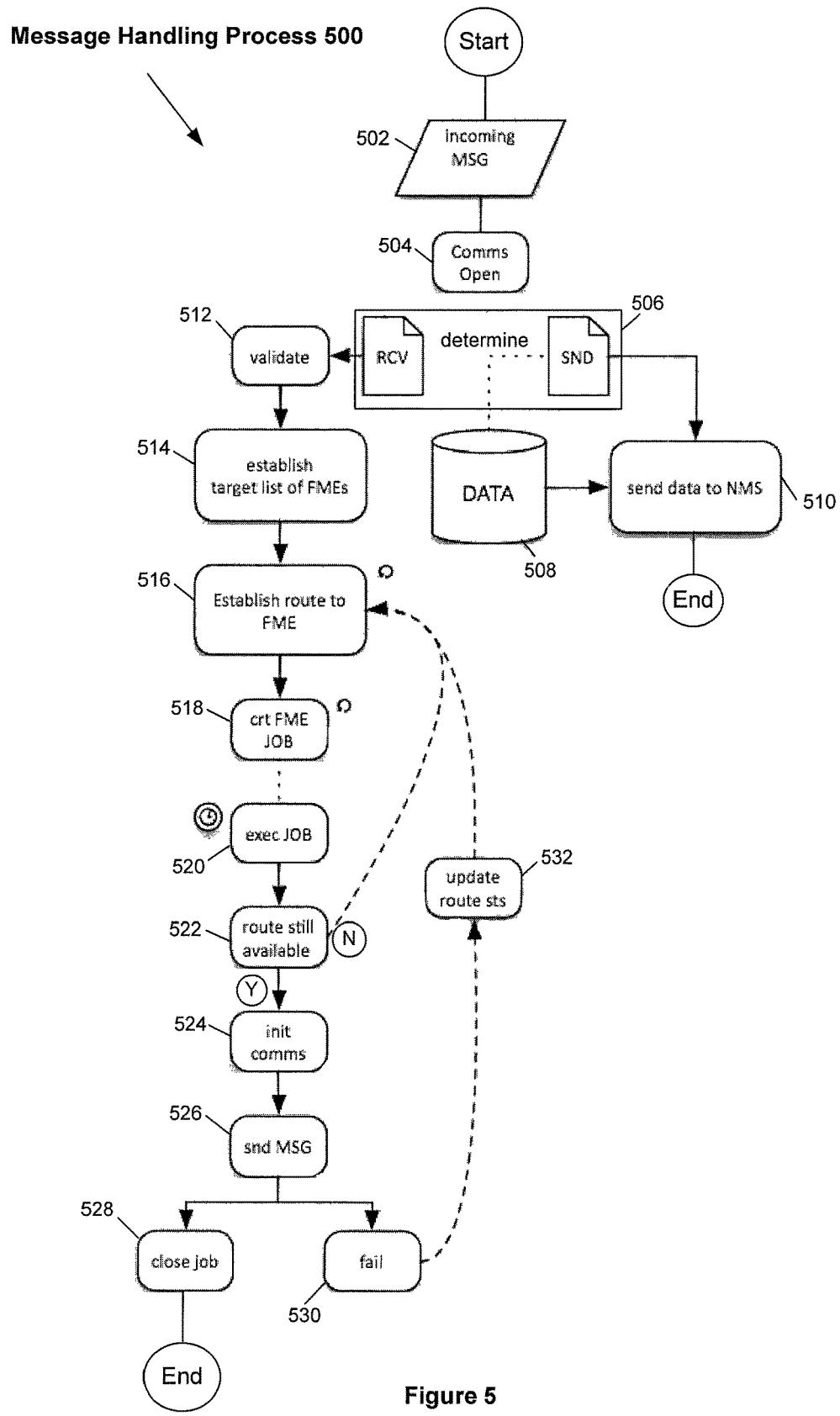
FIG. 5 is a flowchart of a message handling process of the concentrator.

The concentrator 104 provides and executes a message handling process 500, as shown in FIG. 5, commencing with the concentrator 104 receiving a message including message data from the NMS 108 (step 502). The concentrator 104 opens the appropriate communications port (step 504) and initiates processing of the received message.

The concentrator 104 validates the message format and contents to ensure the message can be processed correctly by checking any available format, headers and CRC tags. The concentrator 104 establishes a list of microengines (MEs) that correspond to a filter represented by the message data. The filter may take the form of a list of specific MEs, a type of ME, or a geographic location, allowing the subset of MEs to be affected by the message to be determined correctly. The concentrator 104 establishes a route to each of the MEs in the target list by determining the appropriate ME-concentrator links 106 (step 516) and by building a list of relevant interfaces for these identified MEs. The concentrator 104 may also delegate sending of data to the second concentrator 118 in the group 116, thereby sharing the communications load between concentrators in the group 116. The message data to be sent is formatted as a job, including communications properties data for each ME, and placed on the Job Queue of the concentrator 104 (step 518). When the ME-concentrator link 106 becomes available, as determined by the queue manager module 304, the job is processed and transmitted to the ME (step 520). The Job Queue determines whether the route is still available (step 522). If the route is not available, the concentrator 104 establishes a new route to the ME by repeating step 516. If the route is still available, as determined in step 522, communications to the ME is initiated using the selected interface (step 524) and the message data is sent (step 526). Acknowledgement data is received from the ME, and if the message has been successfully received, the job on the Job Queue is closed (step 528). If a positive acknowledgement is not received, the sending of message data is determined to have failed (step 530) and the concentrator 104 updates the route status to failure (step 532) and a new route is established to the ME by repeating step 516. While the communications channel 504 is open, any outstanding Concentrator-NMS data 508 including data resulting from the delivery of messages to the MEs 506 is sent to the NMS 510.

Figure 6:
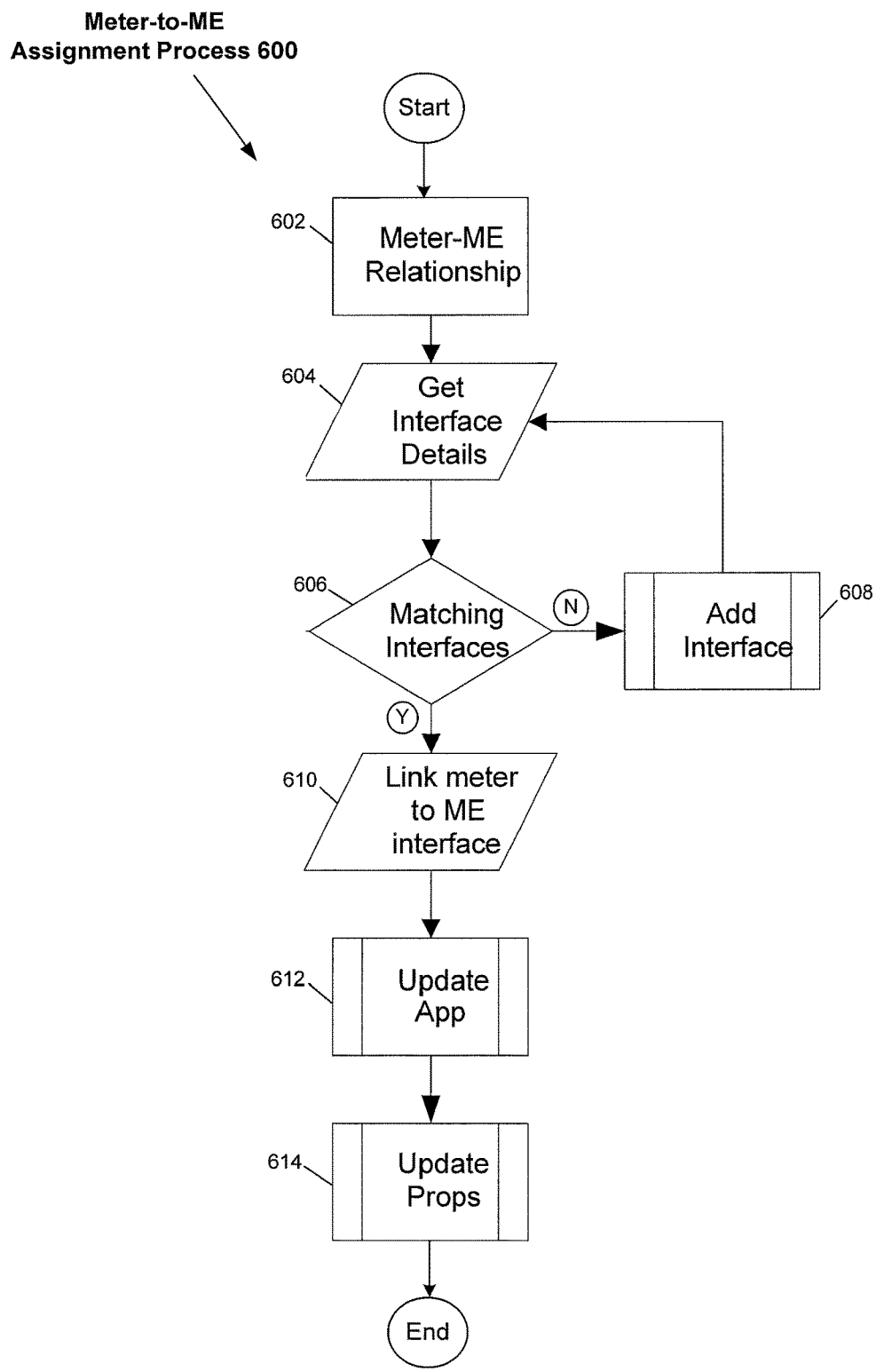
FIG. 6 is a flowchart of a device-to-ME assignment process of the concentrator.

The NMS 108 performs a meter device-to-ME assignment process 600, as shown in FIG. 6, commencing by determining from the database a link between the first meter 112 and the first ME 114, or equivalently a link between the third meter 152 and the first ME 114, or equivalently between the IHD ME 144 and the first ME 114, or between the second ME 138 and the first ME 114 (step 602). The NMS 108 retrieves data representing the type of interface provided by the meter from the database and a list of interfaces available in the ME 114 from the profile corresponding to the ME 114 stored in the NMS 108 (step 604). The NMS 108 determines whether there is a match between the interface of the meter and an interface supported by the ME 114 as listed as a value in the supported protocols parameter of the profile of the ME 114 (step 606). If the interfaces do not match, a new interface is added to the profile of the ME 114 and transmitted to the ME 114 for installation to operate as part of the connectivity module 204 (step 608). If the interfaces match, as determined in step 606, a new link is established (step 610) between the ME 114 and the meter (e.g. meter 112) and the applications and the properties data of the ME 114 are updated by the NMS 108 (steps 612 and 614).

Figure 7:
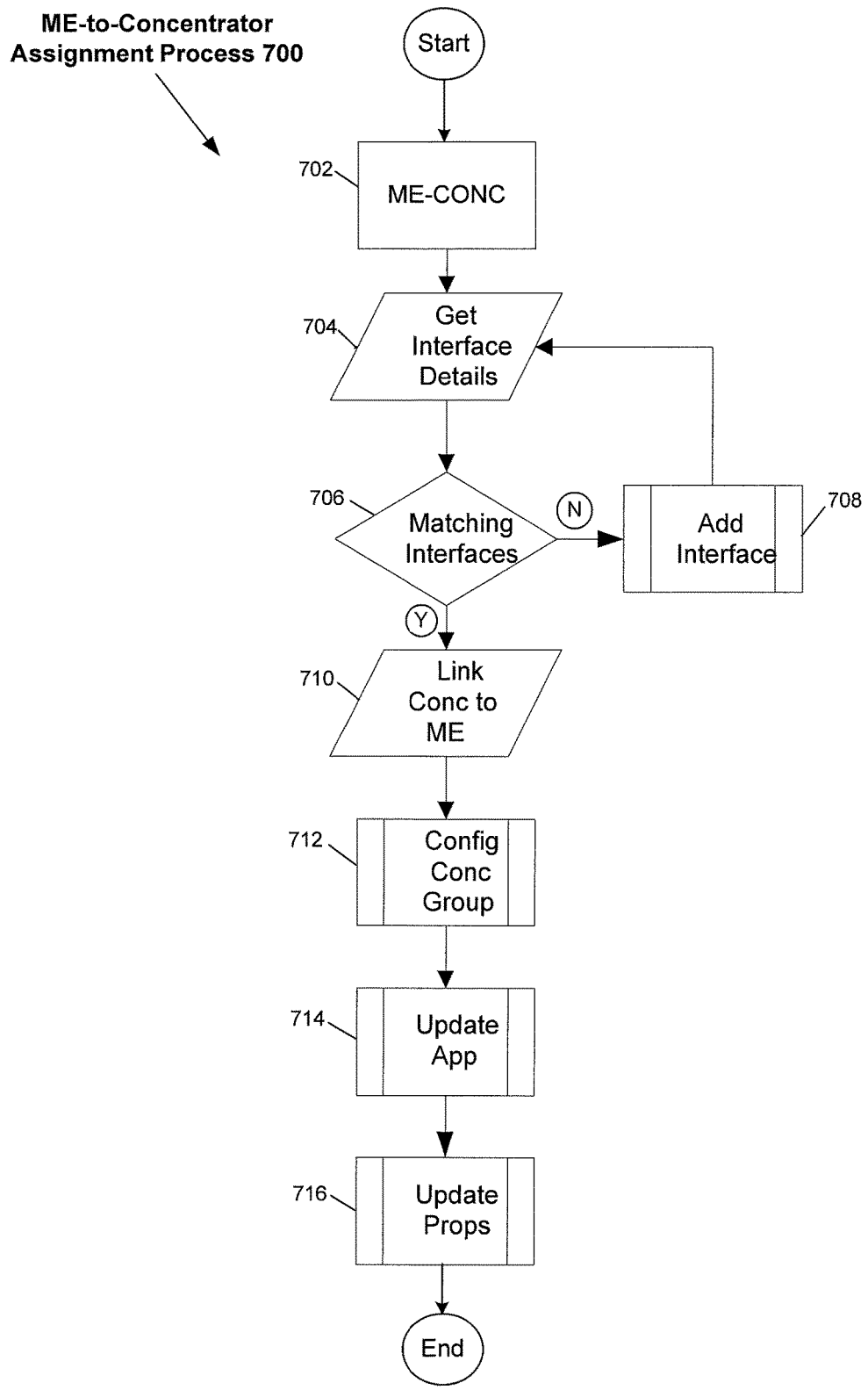
FIG. 7 is a flowchart of an ME-to-concentrator assignment process of the concentrator.

The NMS 108 performs an ME-to-concentrator assignment process 700, as shown in FIG. 7, substantially equivalent to the meter-to-ME assignment process 600. The ME-to-concentrator assignment process 700 commences with the NMS 108 receiving details of a new ME linked to the concentrator 104 (step 702) and the NMS 108 receiving details of the interfaces available in the concentrator 104 and the ME, as found in the ME profile and specifically the communication method parameter (shown in Table 1). The NMS 108 determines whether the interfaces match (step 706) and if they do match, a new interface is added to the communication network parameter value, together with corresponding communications protocol information, from interface data stored by the NMS 108 (step 708). Once it is determined that the interfaces match in step 706, the ME-concentrator link 106 is established (step 710) and connectivity to the group 116 is configured based on load balancing parameters store in the database on NMS 108 (step 712). Following assignment of the new ME, the concentrator application and the concentrator properties are updated thereby providing for the same profile data in both the ME and a corresponding profile copy in the concentrator 104 (steps 714 and 716).

Figure 8:
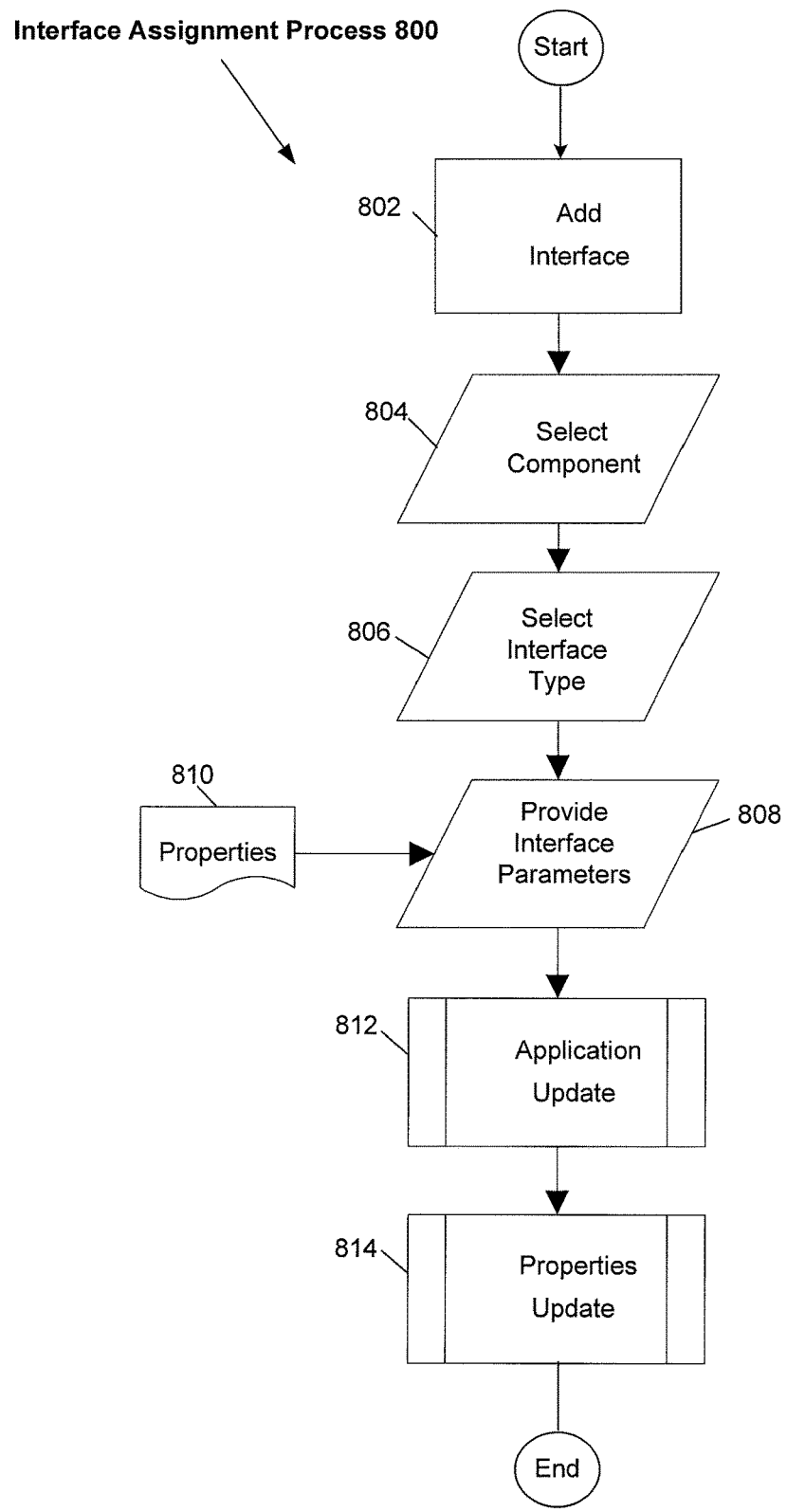
FIG. 8 is a flowchart of an interface assignment process of the concentrator.

The NMS 108 provides and executes an interface assignment sub-process 800, as shown in FIG. 8. This sub-process handles interface assignment for the concentrator 104 and MEs depending on context. The NMS 108 commences invoking the process (802) to add an interface and selects a component (step 804) to assign the interface. The interface type is selected (806) and the interface parameters obtained (808) for that type from the properties folder (810) based on context, and whether completing a Device-ME, ME-Concentrator or Concentrator-NMS interface assignment. Once the parameters are obtained, an application update (812) and a properties update (814) are run as necessary to update the application and the properties data for the component. Updated files can be sent to the relevant component.

Figure 9:
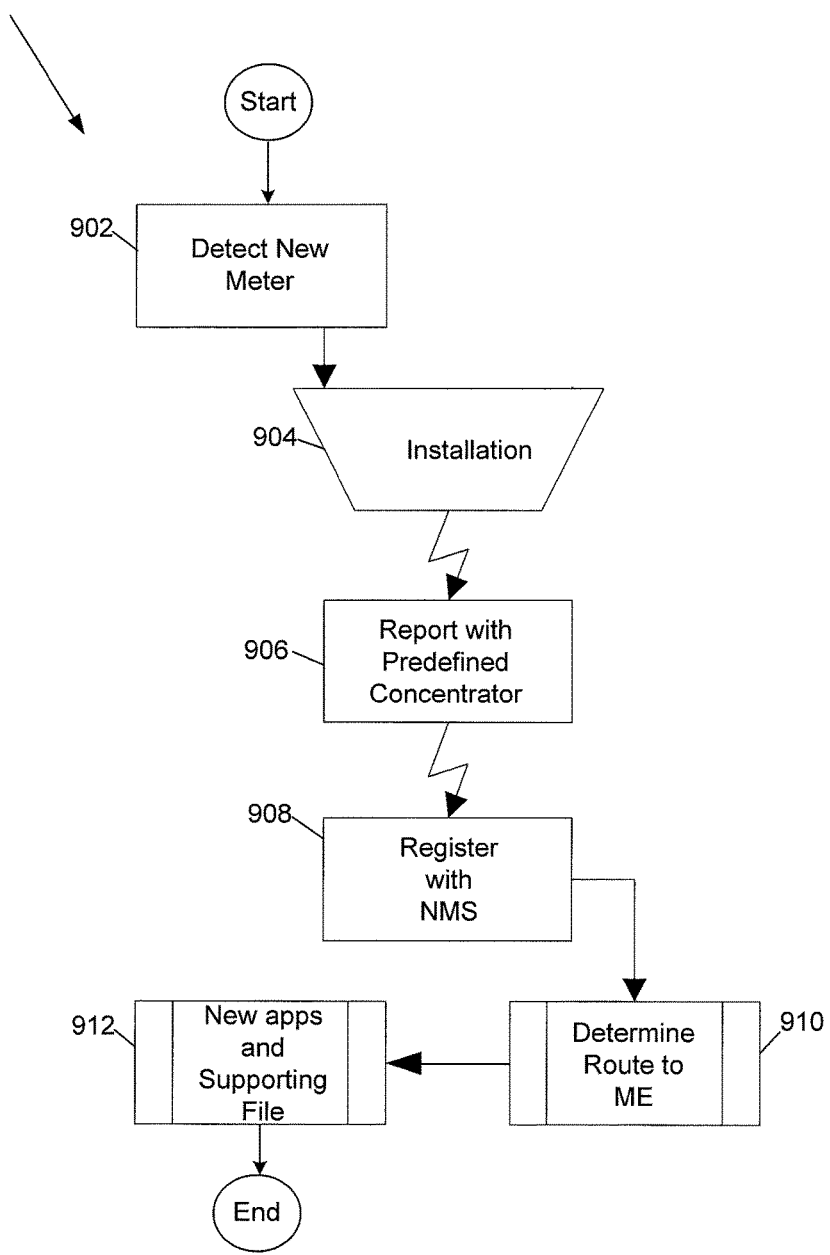
FIG. 9 is a flowchart of a device provisioning process of the communications system.

The communication system 100 provides a provisioning process 900, as shown in FIG. 9, commencing with the detection of a new meter (step 902) triggered during installation of a new ME, followed by installation of the relevant interfaces for this new meter and the ME to which it is attached (step 904). The ME automatically reports to a pre-defined commissioning concentrator (step 906) which forwards a connection alert regarding the connection of the new meter to the NMS 108, which registers the new meter (step 908) and determines the concentrator with the "best" route between the new meter and the NMS 108 (step 910). In step 910 "best" relates to a combination of interface type, interface availability, communications methods and for a group 116, load balancing factors. The NMS 108 transmits new applications and properties data to the ME associated with the new meter to allow the ME to interface with the new meter and to use properties data appropriate for the new meter, such as an appropriate tariff for the geographical location of the new meter (step 912).

Figure 10:
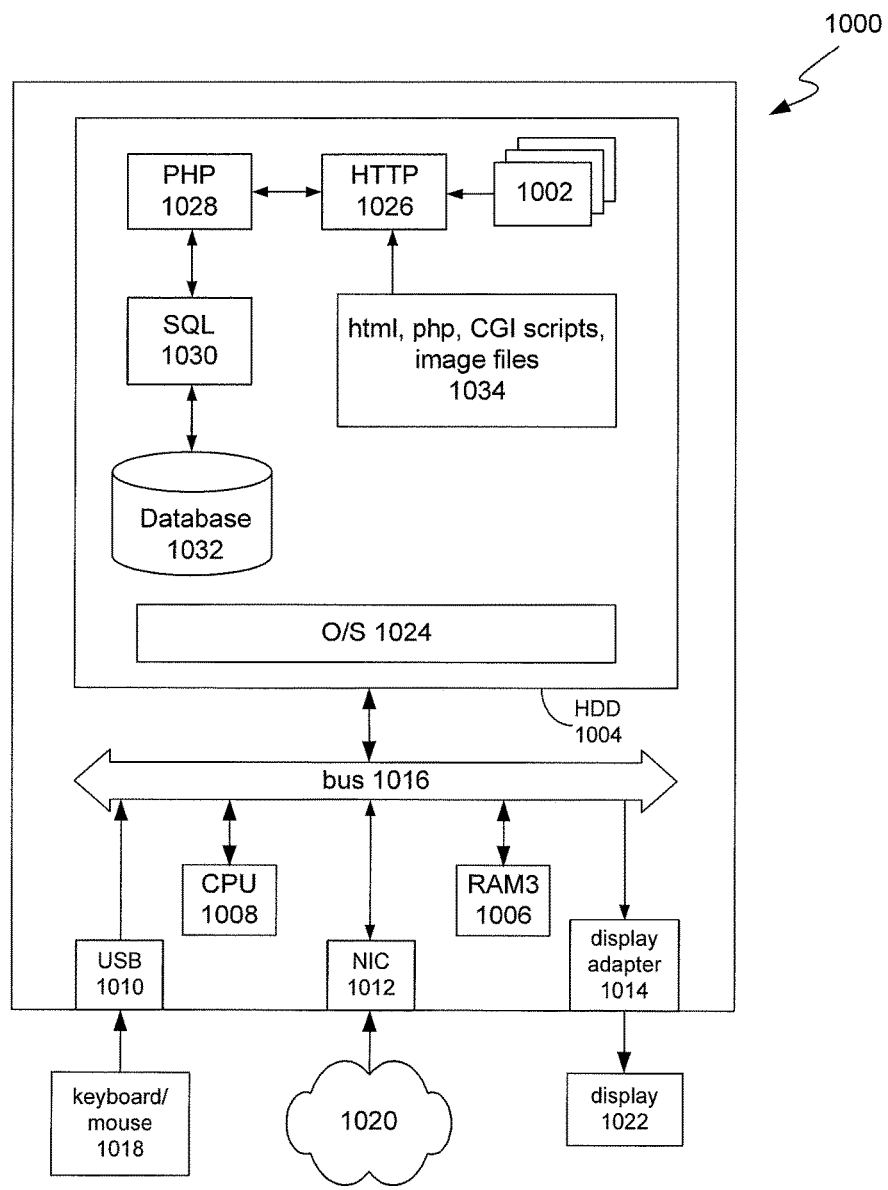
FIG. 10 is a schematic block diagram of a computing system of the network management system.

The NMS 108 includes a standard computer system 1000 such as an 32-bit or 64-bit Intel Architecture based computer system, as shown in FIG. 10, and the processes executed by the system 1000 are implemented in the form of programming instructions of one or more software modules 1002 stored on non-volatile (e.g., hard disk) storage 1004 associated with the computer system, as shown in FIG. 10. Alternatively, at least parts of the software modules 1002 could be implemented as one or more dedicated hardware components, such as application-specific integrated circuits (ASICs) and/or field programmable gate arrays (FPGAs).

The system 1000 includes standard computer components, including random access memory (RAM) 1006, at least one processor 1008, and external interfaces 1010, 1012, 1014, all interconnected by a bus 1016. The external interfaces include universal serial bus (USB) interfaces 1010, at least one of which is connected to a keyboard and a pointing device such as a mouse 1018, a network interface connector (NIC) 1012 which connects the system 1000 to a communications network such as the Internet 1020, and a display adapter 1014, which is connected to a display device such as an LCD panel display 1022.

The system 1000 also includes a number of standard software modules 1026 to 1030, including an operating system 1024 such as Linux Enterprise Server or Microsoft Windows Server 2008, web server software 1026 such as Apache, scripting language support 1028 such as PHP, or Microsoft ASP, and structured query language (SQL) support 1030 such as MySQL, which allows data to be stored in and retrieved from an SQL database 1032.

Together, the web server 1026, scripting language 1028, and SQL modules 1030 provide the system 1000 with the general ability to allow users of the Internet 1020 with standard computing devices equipped with standard web browser software to access the system 1000 and in particular to provide data to and receive data from the database 1032. It will be understood by those skilled in the art that the specific functionality provided by the system 1000 to such users is provided by scripts accessible by the web server 1026, including the one or more software modules 1002, and also any other scripts and supporting data 1034, including markup language (e.g., HTML, XML) scripts, PHP (or ASP), and/or CGI scripts, image files, style sheets, and the like. The components 1002 and 1026 to 1034 correspond to the modules 402 to 442 described previously.

The NMS 108 and the concentrators 104, 118, 122 can be implemented using Oracle Corporation's Fusion Middleware products, including the Oracle WebLogic Suite, WebLogic Server, and Service Bus.

Each of the blocks of the flow diagrams of the processes described herein may be executed by a module or a portion of a module. The processes may be embodied in a machine-readable and/or computer-readable medium for configuring a computer system to execute the method. The software modules may be stored within and/or transmitted to a computer system memory to configure the computer system to perform the functions of the module. The communications system 100, and in particular the MEs 114, 138, 144 and concentrators 104, 118, 122 normally process data according to a program (a list of internally stored instructions such as a particular application program and/or an operating system) and produces resultant output information via input/output (I/O) devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Many modifications will be apparent to those skilled in the art without departing from the scope of the present invention as herein described with reference to the accompanying drawings.

The invention claimed is:

1. A method executed by a concentrator connected between a plurality of remote units and a management server, the method including:
   (i) receiving and storing properties data from a remote location and associated with a remote unit including a microengine and a meter for measuring usage of a resource at a customer's premises, the properties data representing a profile of the remote unit and including communications parameters and device parameters, the communications parameters representing selectable communications protocols and associated equipment the microengine supports;

(ii) receiving message data representing a request associated with the remote unit from the management server;
(iii) generating response data representing a response to the request based on the message data and the stored properties data; and
(iv) sending the response data to one of the remote unit and the management server, as determined by the request based on the message data, wherein the properties data representing the communications parameters is used to determine the selectable communications protocols and associated equipment the microengine supports and establish an available communications link among multiple different communications links supported by at least some of the selectable communications protocols the microengine supports by selecting and using the respective communications parameters of the properties data for the determined communication link to send the response data to the remote unit,
wherein the concentrator maintains job queues for managing data sent on links to the remote units and to the management server, wherein the job queues establish sessions on the links based on a bandwidth capacity of the links, the bandwidth capacity determined based on the properties data.

2. The method of claim 1, wherein the properties data includes at least one of:
(i) measurement data representing measurement of usage of the resource at the customer's premises;
(ii) configuration data representing configuration of the remote unit;
(iii) data representing a meter reading schedule;
(iv) data representing demand side management profile information;
(v) data representing supported communications protocols the microengine can use for the microengine to concentrator, microengine to microengine and microengine to meter links and properties per protocol parameters;
(vi) data representing configuration of meters and microengines with a communications connection to the remote unit;
(vii) data representing carbon footprint information; and tariff data representing a tariff associated with usage of the resource.

3. The method of claim 1, further comprising receiving and storing second properties data for a second remote unit connected to the other remote unit, and communicating with the second remote unit based on the second properties data.

4. The method of claim 3, wherein the second remote unit includes a microengine and an associated display, and a link is established between the microengines of the remote units.

5. The method of claim 3, wherein the second remote unit includes a smart meter for monitoring usage of a resource at a customer's premises, and a link is established between the smart meter and the microengine of the other remote unit.

6. The method of claim 3, wherein the second remote unit includes a second microengine and a second meter for measuring usage of a resource at a customer's premises, and a link is established between the second microengine and the microengine of the other remote unit.

7. The method of claim 3, wherein the concentrator establishes links to microengines of a first group of remote units, and instantiates a second concentrator process to establish links with a second group of remote units.

8. The method of claim 3, wherein the concentrator establishes a concentrator to management server link to serve stored properties data of the remote units on demand to the management server, in response to requests for the management data from the remote computers of resource market participants.

9. The method of claim 1, wherein the response data sent to the remote unit represents alert data associated with an event and causes generation of alert information at a location associated with said remote unit.

10. A non-transitory computer readable storage medium comprising a computer program code for performing the method of claim 1.

11. A communications system for controlling and interrogating a network of distributed remote units, the communications system including:
one or more processors and a memory;
a network management server for requesting and serving data associated with the remote units;
concentrators for communicating with the network management server and communicating with respective remote units using respective selectable communications protocols based on properties data maintained at the concentrators, the properties data being from a remote location and representing state and communications parameters associated with each remote unit, wherein the concentrators are being executed by processors; and
remote units for serving properties data and message data to a concentrator and receiving data, including application files and service level data, wherein the remote units are being executed by processors,
wherein the properties data of the remote units represents profiles of the remote units and devices installed with or communicating with the remote units, and the profiles each include communications parameters and device parameters, the communications parameters representing the communications protocols and associated equipment the respective remote unit supports; and
wherein a concentrator is configured to communicate with a remote unit using an available communications link determined in accordance with the communications protocols and associated equipment the respective remote unit supports and established among multiple different communications links supported by at least some of the selectable communications protocols the respective remote unit supports by selecting and using the respective communications parameters of the properties data for the determined communication link,
wherein the concentrator maintains job queues for managing data sent on links to the remote units and to the management server, wherein the job queues establish sessions on the links based on a bandwidth capacity of the links, the bandwidth capacity determined based on the properties data.

12. The communications system of claim 11, wherein the remote units are adapted to receive, build, send and execute said application files.

13. The communications system of claim 11, including clusters of said concentrators using a respective communications protocol for connection to the remote units.

14. The communications system of claim 11, wherein at least one of the remote units includes a meter for measuring usage of a resource at a customer's premises and a microengine for maintaining the properties data.

15. The communications system of claim 14, wherein at least one of the remote units includes a microengine for establishing a link with another microengine of another remote unit, and a display unit providing real-time information associated with consumption and control of usage of the resource.

16. The communications system of claim 15, wherein real-time information includes bill presentation based on data obtained from the other remote unit.

17. The communications system of claim 14, wherein at least one of the remote units stores property data for communicating with another remote unit.

18. The communications system of claim 11, wherein the service level data includes tariff data associated with the respective locations of the remote units.

19. A method executed by a concentrator connected between a plurality of remote units and a management server, the method including:
  (i) receiving and storing properties data from a remote location and associated with a remote unit including a microengine and a meter for measuring usage of a resource at a customer's premises, the properties data representing a profile of the remote unit and including communications parameters and device parameters, the communications parameters representing selectable communications protocols and associated equipment the microengine supports;
  (ii) receiving message data representing a request associated with the remote unit from the management server;
  (iii) generating response data representing a response to the request based on the message data and the stored properties data; and
  (iv) sending the response data to one of the remote unit and the management server, as determined by the request based on the message data, wherein the properties data representing the communications parameters is used to determine and establish an available communications link among multiple different communications links supported by at least some of the selectable communications protocols by selecting and using the respective communications parameters of the properties data for the determined communication link to send the response data to the remote unit,
wherein the respective communications parameters are for a new interface added to the profile and are transmitted to the microengine when interfaces of the determined communications link do not match;
wherein the concentrator maintains job queues for managing data sent on links to the remote units and to the management server, wherein the job queues establish sessions on the links based on a bandwidth capacity of the links, the bandwidth capacity determined based on the properties data.

* * * * *

UNITED STATES PATENT AND TRADEMARK OFFICE
CERTIFICATE OF CORRECTION

PATENT NO. : 10,063,942 B2
APPLICATION NO. : 13/260834
DATED : August 28, 2018
INVENTOR(S) : Andrew Paul Donaghey et al.

It is certified that error appears in the above-identified patent and that said Letters Patent is hereby corrected as shown below:

In the Claims

Column 14, Line 41, Claim 11, after "supports;" delete "and".

Signed and Sealed this
Twenty-third Day of October, 2018

Andrei Iancu
*Director of the United States Patent and Trademark Office*